Nov. 15, 1966　　　J. R. McLOUGHLIN　　　3,286,020
COVERING FOR POWER LINE CONDUCTORS TO REDUCE WINDAGE, CORONA
LOSS AND RADIO FREQUENCY INTERFERENCE
Filed Dec. 24, 1964
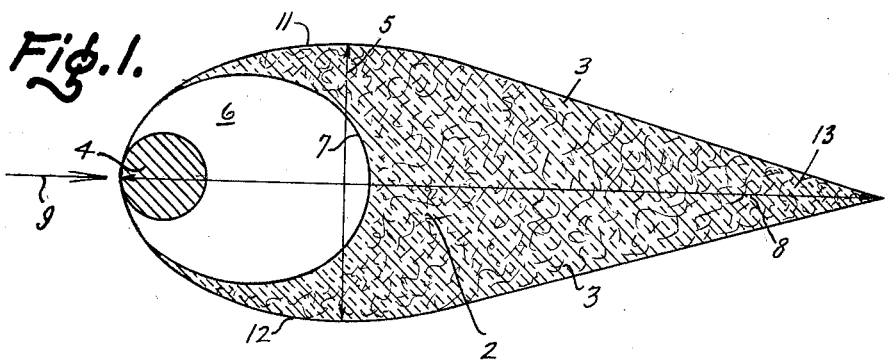
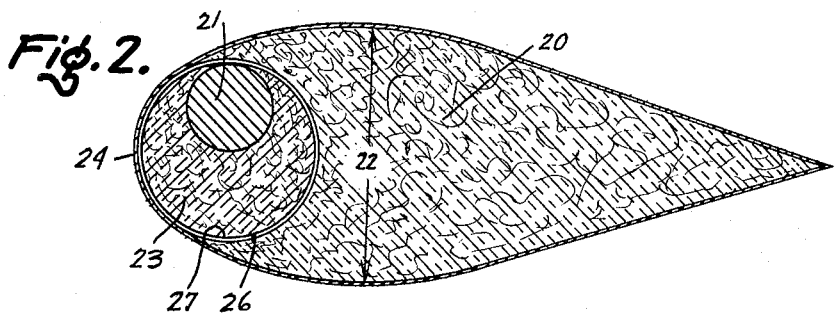
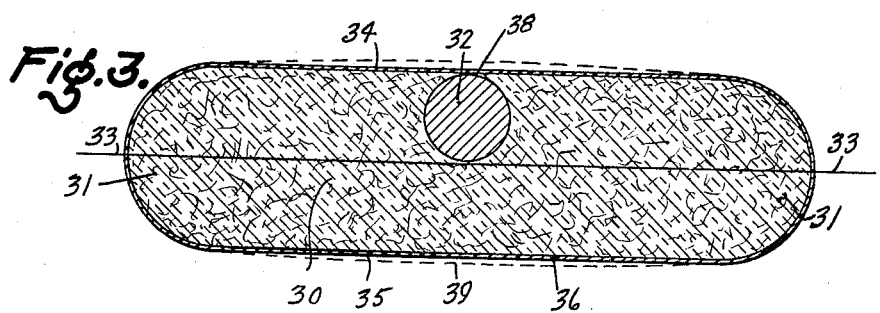
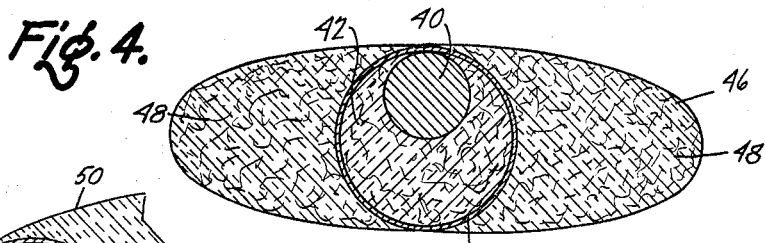
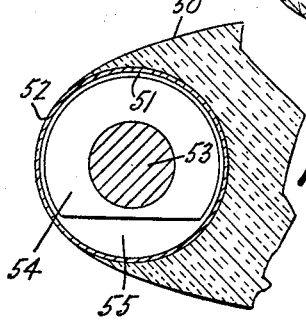
Inventor
Joseph R. McLoughlin
by Paul A. Frank
His Attorney

United States Patent Office 3,286,020
Patented Nov. 15, 1966

3,286,020
COVERING FOR POWER LINE CONDUCTORS TO REDUCE WINDAGE, CORONA LOSS AND RADIO FREQUENCY INTERFERENCE
Joseph R. McLoughlin, Burnt Hills, N.Y., assignor to General Electric Company, a corporation of New York
Filed Dec. 24, 1964, Ser. No. 421,017
13 Claims. (Cl. 174—42)

My invention relates to an apparatus for reducing adverse effects on electrical transmission conductors, and more particularly, an apparatus for reducing the effects of windage, corona loss and radio frequency interference on transmission conductors.

Electrical power conductors which are hung on towers above ground are subjected to serious stresses due to forces caused by blowing wind, commonly referred to as windage. These windage forces cause a horizontal component of force on supporting insulators and towers and undesirable galloping, swaying and vibrational motions of the conductors. Electrical transmission lines also have the disadvantage of corona loss, a phenomenon caused by ionization of the air around electrical wires due to high voltage passing therethrough. Corona loss produces a luminescence and arcing around the conductors to limit the voltage that can be effectively applied thereto without resulting in undue power loss. Another problem often encountered with high voltage transmission lines is radio frequency interference, also related to corona loss phenomenon and which causes power transmission lines to radiate radio frequency signals which seriously interfere with their effective operation. Many attempts to solve this multitude of problems have led to the solution of one without regard to the others. Attempts to solve the windage problem have led to weighting the transmission conductor or providing coupled weights at the towers, where the transmission cable is connected, to dampen vibrations on the cable. These measures seek merely to control an undesirable windage effect after it has occurred, not to prevent its occurrence. There have been some attempts at remedying the corona loss problem most of which have revolved around placing casings filled with a granular material such as graphite around the conducting cable to increase the conductors diameter. Such a solution intensifies the windage problem by providing a larger and heavier circular diameter against the force of the wind. The radio frequency interference problem has not been attacked with any degree of dilligence as far as high power transmission cables are concerned.

The need arises for a compact, low cost covering that can be placed over a transmission conductor to minimize the windage and corona loss problems while at the same time controlling radio frequency interference by attentuating the interfering signals.

My invention envisions a covering, having an air foil shape, that fits over a transmission cable for reducing windage thereon, which covering has a thin coating of a conductor and is so connected to the transmission cable so that corona loss is also substantially reduced thereon.

The chief object of the present invention is the provision of a light weight air foil member constructed in a manner for reducing windage on a transmission cable and having a thin coating of a semiconductor or conductor electrically connected to the transmission cable, to substantially reduce corona loss thereon.

Another object of my invention is the provision of an air foil shaped member for reducing windage on electrical transmission cables, having a semiconductive or conductive surface that is larger in circumference than the transmission cable, and electrically connected thereto to effectively reduce corona losses on the transmission cable.

Another object of my invention is the provision of an air foil shaped member for reducing windage on electrical transmission cables, having a semiconductive or conductive interior surface that has a larger circumference than the transmission cable, without having any radii that are smaller than the radius of the transmission cable, to increase the effective circumference of the cable for reducing corona losses thereon.

Another object of my invention is the provision of a rotatable air foil shaped member for reducing windage on electrical transmission cables, having a semiconductive interior surface, that has a larger circumference than the transmission cable, to increase the effective circumference of the cable for reducing corona losses and radio frequency interference thereon.

Another object of my invention is the provision of a fixed air foil covering for a transmission cable, which is fastened to the cable in a horizontal position, to promote streamlined flow over the cable and which has a coating of a semiconductor, for increasing the effective circumference of the cable, to reduce corona loss and radio frequency interference thereon.

Another object of my invention is the provision of an air foil member which has a semiconducting surface for reducing corona loss and radio frequency interference on a transmission cable and which is so positioned on the transmission cable that it is capable of orientating itself with the direction of the wind to also reduce windage on the transmission cable.

Another object of my invention is the provision of an air foil member, for reducing windage on a transmission line, connected to the line in an eccentric manner to provide means for dissipation of heat from the electrical conductor through the air foil member to the atmosphere.

A further object of my invention is the provision of an air foil member, for reducing windage on a transmission line having means for effectively reducing corona loss and radio frequency interference thereon, which quickly snaps onto an already existing and installed power cable.

These and other objects of my invention will be more readily perceived from the description which follows.

One of the features of my invention is a highly efficient air foil shaped member which fits over a transmission cable to promote streamlined flow around and behind the cable and the air foil to effectively reduce windage thereon, having an electrically semiconductive surface surrounding the transmission cable, that is connected thereto, to increase the effective circumference of the cable and thereby reduce corona losses and radio frequency intereference thereon.

The attached drawing illustrates preferred embodiments of my invention in which:

FIGURE 1 is a cross-sectional view of the air foil member of my invention;

FIGURE 2 is a cross-sectional view of a modification of the member of FIGURE 1;

FIGURE 3 is a cross-sectional view of a further modification of the member of FIGURE 1;

FIGURE 4 is a cross-sectional view of a still further modification of the member of FIGURE 1; and FIGURE 5 is a partial cross-sectional view of a modification of the device of my invention.

In FIGURE 1 there is shown a cross-sectional view of the aerodynamic member embodying my invention which has means therein for reducing corona losses and radio frequency interference. The construction includes an air foil 2 constructed along the lines disclosed in my copending application, Serial No. 421,018, entitled, "Covering for Reducing Windage Effects," and comprising a foam material such as foamed rubber or polystyrene which is light in weight and therefore easily oriented by the wind. A thin coating 3 of a plastic or rubber is placed on the outer surface of member 2 to protect it from the weather conditions to which it is subjected. The overall shape of member 2 is such that it provides a gradually sloping surface, first increasing and then decreasing, so that wind or other currents flow over surface 3 in an essentially streamlined manner without any turbulence being imparted thereto. This smooth streamlined flow occurs and reduces windage even though the frontal area of the total member 2 plus the electrical cable 4 is far greater than electrical cable 4 alone. Windage on the total members 2 and 4 together may be as low as 20 percent or lower of that on the electrical conductor 4 alone. When the electrical conductor is employed alone, wind causes turbulent vortices on the side of the electrical conductor furthest from the direction of the wind, which turbulence results in a pressure differential across the conductor, and therefore in a far greater resistance to the wind than the entire aerodynamic body 2 and conductor together. As this turbulence builds up, swaying of the transmission conductor may result in short circuiting the line against a supporting structure or in undesirable vibrations of the line; sometimes of large amplitude.

Transmission cable 4 passes through opening 6 in body 2, which opening is oval in shape as shown in FIGURE 1 to obtain the largest circumference that can be encompassed with a maximum radius of curvature. Alternatively, a circular opening or other opening with a radius of curvature that is at least equal to or larger than the radius of transmission cable 4 can also be employed successfully. Surface 7 is coated with a semiconductive or conductive coating, such as a plastic or thin rubber skin, containing particles of carbon black or metal therein, to provide an electrically conductive surface. When the cable is electrically coupled to surface 7, the effective surface of the cable for corona loss purposes becomes a function of the circumference of opening 7 and not the circumference of cable 4 alone. Naturally, there must be electrical contact between cable 4 and surface 7 for effective operation. This increase in effective cable circumference greatly decreases the corona loss, while the cross-sectional area of transmission conductor 4 remains constant. The effective surface of the cable has therefore been increased so that higher voltages can be impressed on conductor 4 without increasing corona loss. In other words, we have increased effective cable diameter without actually increasing the diameter (and consequently the weight of the cable) through which the current flows; high voltage transmission through small conductors is then possible without incurring disadvantageous power loss and radio frequency interference due to corona loss thereon.

Surface 7 can be either a conductor or semiconductor for reducing corona loss but must be a semiconductor for reducing radio frequency interference on the transmission cable. A semiconducting surface is employed to attenuate radio frequency waves which might be propagated along the conductor. The resistivity of skin 7 is adjusted to a critical value so that the propagation of radio frequency radiation along the conductor is reduced to a minimum. Thus, the propagation of radio waves from local corona on the conductor is limited to a short length of conductor; rather than the waves propagating along the conductor and radiating from a much longer conductor length.

It is also noted that power cable 4 is eccentric with respect to opening 6, which eccentricity results in the power cable touching that side of the surface 7 which is in direct contact with the outside air. This effectively dissipates heat from the conductor through the conducting surface to the ambient air, thereby preventing heat build-up within opening 6 in which conductor 4 is placed. A snap ring or other closure, such as hinges, is employed to effectively secure member 2 onto transmission cable 4. Alternatively, member 2 may be fabricated in two halves which are then fastened together over conductor 4.

Member 2 is rotatable with respect to cable 4 thereby being able to orient itself continuously with respect to the wind. As the wind builds up, the pressure on upper surface 11 becomes lower than on lower surface 12 of member 2 to cause member 2 to swing to a position whereby tail or trailing edge 13 is approximately at the furthest distance from the wind, in relation to transmission cable 4, and where the cross-sectional length 8 of member 2 through which the plane of symmetry passes is parallel to the wind direction. This principle is essentially the same as a weather vane where the tail of the vane is pivoted so that it is always diametrically opposed to the direction from which the wind is coming. Thus, by attaching member 2 over a transmission line, it hangs with tail 13 in a vertical direction until the wind turns it and orients it on the opposite side of the cable from the direction in which the wind is coming to effectively reduce windage on transmission cable 4. At the same time, as previously pointed out, air foil member 2 dissipates heat, reduces corona losses and substantially reduces the radio frequency interfrence propagated by the transmission cable.

FIGURE 2 illustrates a modification of the device of FIGURE 1. In this mode, cable 21 is encased within member 23, which may be constructed of the same material as air foil 20, and is secured to transmission line 21 so that air foil member 20 can more closely rotate with respect thereto. Area 26 between member 23 and air foil 20 contains a suitable lubricant such as a Teflon ring or a liquid lubricant to permit the proper relative rotation therebetween. On the outer surface of member 23 or the inner surface of member 20 is a thin coating of a conductor or a semiconductor, to provide the same effect as coating 7 in FIGURE 1. The circumference of member 23 then acts as the effective circumference of transmission conductor 21 for corona loss reduction in the same way as the circumference of opening 7 in FIGURE 1. Coating 27 is, of course, electrically coupled with conductor 21 at a point along its surface in the same manner as in FIGURE 1. Radio frequency interference is also reduced by this thin coating 27 in the same way as in FIGURE 1 when it is a semiconductor, as previously pointed out. Member 20 rotates freely about member 23 to properly align itself with the direction of the wind in the same manner as the mode of FIGURE 1. Thus, in FIGURE 2, as with member 2 in FIGURE 1, the plane of symmetry which passes through the cross-sectional length of member 20 aligns itself in a plane parallel to the direction of the wind to reduce windage thereon. As in FIGURE 1, heat is dissipated by conductor 21 through outer surface 27 of member 23 to the atmosphere.

In FIGURE 3 there is shown a cross-sectional view of flat member 30 having rounded ends 31 to give the overall member an aerodynamic air foil shape. This member 30 is constructed of the same material as member 2 or member 20 in FIGURES 1 and 2, but is fixed to transmission cable 32 and does not rotate with respect thereto. Its cross-sectional length or plane of symmetry 33 is prepositioned in a horizontal plane so that the wind, which is almost always in a relatively horizontal direction, impinges on either end 31 and flows over surfaces 34 and 35 on the top and bottom thereof to provide smooth streamlined flow with subsequent reduction of windage thereon. This shape also reduces swing angles by virtue of a negative lift or pressure downward as conductor 32 swings out. Air foil 30 then reduces the turbulence in the same manner as FIGURES 1 and 2, that would occur if conductor 32 was simply hung alone. As aforementioned, turbulence would occur on the side opposite from where the wind was blowing and a pressure gradient and subsequent high coefficient of drag would result. Even though the entire air foil 30 has greater frontal area than the circular conductor 32, its drag is far less since turbulent vortical flow is substantially reduced thereon. A thin skin 36 around the entire member 30 is composed of a conductive or semi-conductive plastic or rubber film as the skin in FIGURES 1 and 2 for the same purposes thereof. The effective circumference of the cable as far as corona loss is concerned is now the entire outer shell 36 and not simply the circumference of conductor 32. This operates to effectively reduce corona loss and radio frequency interference in the same manner as the prior modes of my invention. Heat is also dissipated effectively by the eccentricity of member 32 in contacting surface 36 at point 38 so that heat from line 32 is effectively dissipated therethrough to the ambient air. Dashed lines 39 indicate another mode of my invention where there is a slight curvature in member 30 to further aerodynamically shape it.

FIGURE 4 illustrates a still further mode of my invention where cable 40 is covered by a circular member 42 which is permanently affixed thereto; which member 42 has a thin coating of a semiconductor or conductor on its outer surface to make the effective circumference of conductor 40 for corona loss purposes that of member 42. Operation of this surface is the same for both corona loss and radio frequency attentuation as surface 36 of FIGURE 3. Surrounding member 42 is member 46 composed of a foamed material such as that used in the prior modes of this invention. For example, polystyrene foam or foam rubber can be used. Member 46 is shaped with a substantially elliptical cross section to provide an effective surface for reducing windage on member 40. This mode operates in essentially the same manner as FIGURE 3; air foil 40 is affixed in a horizontal plane and since the wind, as previously explained, varies only slightly therefrom, the wind effectively impinges on ends 48 to travel thereon in a streamlined manner to reduce the windage on conductor 40. Ends 48 might also be sharpened further in the interest of reducing trailing edge turbulence.

It is noted that the skin that forms the outer layer for corona loss and radio frequency interference purposes may contain carbon black, metal particles or other semiconducting or conducting materials as with the prior modes of my invention.

The foam or spongy material comprising the major portion of the air foil devices of my invention may consist of polystyrene, polyethylene, polypropylene, epoxy, rubber, polyurethane, polyvinyl chloride foam or other appropriate light weight foam materials. It is also noted that a thin layer of a plastic material or rubber may be applied to the outer surface of the modes of FIGURES 1, 2 and 4 to effectively protect the foam material from the weather to which it is subjected. That coating may consist of polyvinyl chloride, polyethylene, phenolic resins or other appropriate plastics and elastomers.

It is noted that the desired shape of the major body of FIGURE 3 has a large radius of curvature at the ends to compromise between optimum aerodynamic shape and also to avoid any sharp corners which would increase corona losses.

In FIGURE 4, the corona loss shape, 44, has been surrounded with an aerodynamic shape 46 to make it possible to optimize both shapes.

FIGURE 5 illustrates another way in which my rotating shape 50, may be mounted on the conductor 53. In this case, a ring or spacer 54 is mounted on the conductor 53, said ring having a diameter whereby there is a small clearance between ring 54 and surface 52. Surface 52 would again be a semiconducting or conducting surface and is connected electrically to conductor 53, either by making ring 54 of metal or by providing an electrical connector across ring 54, if ring 54 is of plastic or other insulating substance. An important part of the design of FIGURE 5 is the flattened part of ring 54 wherein segment 55 of ring 54 is cut away. The elimination of this segment of the ring results in the point of contact of surface 52 with ring 54 being closer to the plane of symmetry of foil 50. The reduction of distance between said contact point and plane of symmetry of foil 50 results in better alignment of foil 50 with the wind direction.

It will be appreciated that in all modes of my invention, the air foil is always positionable or positioned in a manner so that a streamlined trailing edge is always on the opposite side of the conductor from where the wind is coming for the wind to pass over the air foil and the conductor in a streamlined manner to reduce windage thereon.

It is also noted that the cross-sectional lengths and heights referred to in this specification, such as cross-sectional length 8 and height 5 in FIGURE 1, are the cross-sectional lengths and heights in a plane perpendicular to the conductor.

It is also important to note that the radius of curvature of the semiconducting or conducting surface at any point along its circumference is greater than or equal to the radius of the transmission cable; otherwise, the use of a smaller radius than the transmission cable would lead to an increase in corona loss, over the corona loss of the transmission cable without my invention, and defeat the purpose of my invention.

It is now apparent my invention attains the objectives set forth. Apparatus embodying my invention is sturdy in construction and well adapted for use in conjunction with various outdoor environments. Windage is reduced as is corona loss and radio frequency interference with the utmost of ease and control.

Specific embodiments of my invention have been illustrated but the invention is not limited thereto since many modifications may be made by one skilled in the art and the appended claims are intended to cover all such modifications as fall within the true spirit and scope of my invention.

What I claim as new and desire to secure by Letters Patent of the United States is:

1. An apparatus for reducing the effects of fluid currents and corona loss on an electrical conductor comprising
   an air foil of nonconducting material attached to the conductor,
      a trailing edge on said air foil having a streamlined shape so that air passes smoothly over the surface of the air foil and the conductor to reduce the effects of windage thereon, and
      means on a surface of said air foil, electrically connected to the conductor, to increase the effective circumference of the conductor and thereby reduce corona losses thereon.

2. An apparatus for reducing the effects of windage and corona loss on an electrical conductor comprising
   an air foil of nonconducting material attached to the conductor,
      a trailing edge on said air foil having a shape so that air passes in a streamlined manner over the surface of the air foil and the conductor to reduce the effects of windage thereon, and
      conducting means on a surface of said air foil, electrically connected to the contuctor to increase the effective circumference of the conductor and thereby reduce corona losses thereon.

3. An apparatus for reducing the effects of windage and corona loss on an electrical conductor comprising
   an air foil of nonconducting material attached to the conductor,
      a trailing edge on said air foil having a streamlined shape so that air passes smoothly over the surface of the air foil and the conductor to reduce the effects of windage thereon, and
      conducting means having a radius of curvature at least equal to the radius of the conductor, covering an interior surface of said air foil and electrically connected to the conductor, to increase the effective circumference of the conductor and and thereby reduce corona losses on the conductor said airfoil being of solid light weight plastic or rubber foam between the surface of said airfoil and said interior surface.

4. An apparatus for reducing the effects of windage and corona loss on an electrical conductor comprising an air foil of nonconducting material attached to the conductor,
- a trailing edge on said air foil having a shape so that air passes in a streamlined manner over the surface of the air foil and the conductor to reduce the effects of windage thereon, and
- conducting means surrounding the conductor having a radius of curvature at least equal to the radius of the conductor, covering a surface of said air foil and electrically connected to the conductor, to surround the conductor with an increased effective circumference to thereby reduce corona losses of the conductor.

5. An apparatus for reducing the effects of windage, corona loss and radio frequency interference on an electrical conductor comprising
an air foil of nonconducting material attached to the conductor,
- a trailing edge on said air foil having a streamlined shape so that air passes smoothly over the surface of the air foil and the conductor to reduce the effects of windage thereon, and
- semiconducting means having a radius of curvature at least equal to the radius of the conductor, covering a surface of said air foil and electrically connected to the conductor to thereby reduce corona losses of the conductor and attenuate radio frequency interference on the conductor.

6. An apparatus for reducing the effects of windage and corona loss on an electrical conductor comprising
an air foil of nonconducting material secured to the conductor,
- a trailing edge on said air foil positionable on the opposite side of the conductor from where the wind is coming for the wind to pass smoothly around both said air foil and the conductor in a streamlined manner to reduce the effects of windage thereon, and
- a conducting coating having a radius of curvature at least equal to the radius of the conductor, covering a surface of said air foil and electrically connected to the conductor, to thereby increase the effective circumference of the conductor to reduce corona losses thereon.

7. An apparatus for reducing the effects of windage, corona loss and radio frequency interference on an electrical conductor comprising
an air foil of nonconducting material secured to the conductor,
- a trailing edge on said air foil having a streamlined shape, so that said air foil is positionable with said trailing edge on the opposite side of the conductor from where the wind is coming, for the wind to pass smoothly around both said air foil and the conductor in a streamlined manner to reduce the effects of windage thereon, and
- a semiconducting means encircling the conductor having a radius of curvature at least equal to the radius of the conductor, covering a surface of said air foil and electrically connected to the conductor, to surround the conductor with an increased effective circumference to thereby reduce corona losses of the conductor and radio frequency interference therefrom.

8. An apparatus for reducing the effects of windage, corona loss and radio frequency interference on an elongated electrical transmission conductor comprising
an air foil, constructed of a material that is nonconductive and substantially lighter in weight than the conductor, secured thereto and having surfaces which converge as the distance from the conductor increases,
- a streamlined trailing edge on said air foil formed by the converging surfaces, so that the air foil is positionable with said trailing edge on the opposite side of the conductor from where the wind is coming for the wind to pass smoothly around both said air foil and the conductor in a streamlined manner to reduce windage thereon, and
- a semiconducting coating means encircling the conductor having a radius of curvature at lease equal to the radius of the conductor, covering a surface of said air foil and electrically connected to the conductor, to surround the conductor with an increased effective circumference and thereby reduce corona losses and radio frequency interference of the conductor.

9. An apparatus for reducing the effects of corona loss and windage on a circular electrical conductor,
an air foil of nonconducting material rotatably secured to the conductor,
- a trailing edge on said air foil rotatably positionable on the opposite side of the conductor from where the wind is coming for the wind to pass smoothly around said air foil and the conductor to reduce the effects of windage thereon,
- means forming a surface within said air foil having a radius of curvature at least equal to the radius of the conductor, and
- conducting means covering said surface and electrically connected to the conductor, to surround the conductor with an increased effective circumference, to thereby reduce corona losses on the conductor.

10. An apparatus for reducing the effects of corona loss, radio frequency interference and windage on an electrical conductor,
an inner member ridigdly ecentrically affixed to the conductor
an air foil of nonconducting material rotatably secured to the member,
- a trailing edge on said air foil rotatably positionable on the opposite side of the conductor from where the wind is coming, for the wind to pass smoothly around said air foil and the conductor, to reduce the effects of windage thereon,
- means forming a surface within said air foil having a radius of curvature at least equal to the radius of the conductor, and
- semiconducting means covering said surface and electrically connected to the conductor to surround the conductor with an increased effective circumference, to thereby reduce corona losses and radio frequency interference of the conductor.

11. An apparatus for reducing the effects of corona loss, radio frequency interference and windage on an electrical conductor,
an air foil of nonconducting material rigidly affixed to the conductor in a substantially horizonal plane,
- trailing edges on said air foil having a streamlined shape, so that said air foil is positioned with one of said trailing edges always on the opposite side of the conductor from where the wind is coming, for the wind to pass smoothly around both said air foil and the conductor in a streamlined manner to reduce the effects of windage thereon, and semiconducting means on the outer surface of said air foil, electrically connected to the conductor, to increase the effective circumference of the conductor and thereby reduce corona losses and radio frequency interference thereon.

12. An apparatus for reducing the effects of corona loss, radio frequency interference and windage on an electrical conductor, an inner member rigidly affixed to the conductor,
an air foil rigidly affixed to said member in a substantially horizontal plane and made of nonconducting material,
  trailing edges on said air foil having a streamlined shape, so that said air foil is positioned with one of said trailing edges on the opposite side of the conductor from where the wind is coming for the wind to pass smoothly around both said air foil and the conductor in a streamlined manner to reduce the effects of windage thereon, and semiconducting means on the outer surface of said inner member, electrically connected to the conductor, to increase the effective circumference of the conductor and thereby reduce corona losses and radio frequency interference thereon.

13. The apparatus of claim 10 wherein said semiconducting means covers the exterior of said member.

References Cited by the Examiner

UNITED STATES PATENTS 2,789,154    4/1957    Peterson _____ 174—127

FOREIGN PATENTS 877,588    9/1942    France.

LEWIS H. MYERS, *Primary Examiner.*

E. A. GOLDBERG, *Assistant Examiner.*